United States Patent [19]
Leavitt

[11] Patent Number: 4,750,145
[45] Date of Patent: Jun. 7, 1988

[54] DOPPLER AGC USING OVERFLOW COUNTERS INTERNAL TO FFT

[75] Inventor: Steven C. Leavitt, Hampstead, N.H.

[73] Assignee: Hewlett-Packard Company, Palo Alto, Calif.

[21] Appl. No.: 9,656

[22] Filed: Jan. 28, 1987

Related U.S. Application Data

[63] Continuation of Ser. No. 591,357, Mar. 20, 1984, abandoned.

[51] Int. Cl.[4] .................................................. G06F 15/332
[52] U.S. Cl. ........................................................ 364/726
[58] Field of Search ..................... 364/726, 745, 576; 342/196

[56] References Cited

U.S. PATENT DOCUMENTS

| | | | |
|---|---|---|---|
| 4,117,541 | 9/1978 | Ali | 364/726 |
| 4,407,018 | 9/1983 | Kanemasa | 364/726 |
| 4,501,149 | 2/1985 | Konno et al. | 364/726 |
| 4,507,725 | 3/1985 | Christopher et al. | 364/745 |

Primary Examiner—David H. Malzahn
Attorney, Agent, or Firm—Donald N. Timbie

[57] ABSTRACT

Apparatus for controlling the amplitude of a signal applied to an FFT system in accordance with the overflows occurring in the various butterfly operations.

9 Claims, 5 Drawing Sheets

DOPPLER AGC USING OVERFLOW COUNTERS INTERNAL TO FFT

CROSS REFERENCE TO RELATED APPLICATION

This application is a continuation of application Ser. No. 591,357 filed Mar. 20, 1984, now abandoned.

BACKGROUND OF THE INVENTION

Discrete Fourier transformed, DFT, can be used to analyze the frequency components of an analog wave. The wave is sampled at a rate $f_s$ until N samples have been obtained and computations are made in accordance with the equation below so as to derive the amplitude of each of N frequencies. The highest position frequency is $f_s/2$, and the frequencies are separated from each other by $f_s/N$. In the equation, k is the frequency indice and n is the time indice.

$$F(k) = \sum_{n=0}^{N-1} s(n) W_N^{kn}, \quad k = 0,1 \ldots, N-1 \quad (1)$$

$$W_N = e^{-j(2\pi/N)} \quad (2)$$

By substituting (2) into (1) we obtain $$F(k) = \sum_{n=0}^{N-1} s(n) e^{-j(2\pi/N)kn} \quad (3)$$

The total number of computations required for a complete analysis is proportional to $N^2$ so as to become excessive for reasonable values of N.

By using a Fast Fourier Transform, FFT, the number of computations required to derive from N input samples the amplitudes of N frequency components is reduced from $N^2$ calculations to $N \log N$ calculations. This is accomplished by noting that all values of the factor $W_N^{kn}$ are not unique. If k equals 1 in equation (3), it can be seen that as n varies from 0 to N, the factor $e^{-j(2\pi/N)kn]}$ is a vector of unit length that rotates through 360° in discrete steps of $2\pi/N$; and if k equals 2, the vector rotates through two revolutions in discrete steps of $4\pi/N$. Thus, as the values of k increase so do the number of revolutions and the angular size of the steps. Therefore, for any value of k, all the vector positions correspond to a position of the vector when k equaled one so that these values can be used over and over again instead of being computed each time.

There is a myriad of ways in which an FFT can perform the required computations, but in general what is known as a "butterfly" operation is performed on each of different groups of a given number of successive samples. When all of the samples have been subjected to a butterfly operation, a first pass has been completed. If there are N samples, there will be N outputs of all the butterfly operations of the pass. Butterfly operations are then performed on different groups of the same given number of butterfly outputs. When all the outputs have been subjected to a butterfly operation, a second pass is completed. If the given number of samples or outputs subjected to each butterfly operation is n, then the number of passes P is determined by the expression $n^P = N$. The number n is known as the radix for the FFT. By way of example, if n=2 and N=8, three passes will be required. The number of butterfly operations in each pass is N/n so that, in this example, each pass would have four butterfly operations.

Each butterfly operation contains at least one adder so that if the amplitude of the wave being analyzed is too large, some of the adders can overflow due to finite word-sized limits carried in hardware and thereby produce incorrect amplitudes for the N frequencies. The butterfly operation also includes multiplying means but the multiplication operation presents no overflow because the $|W_N|$ multiplicand is always equal to or less than unity.

FFTs can be used in both continuous and pulsed Doppler apparatus for the purpose of analyzing the frequencies represented by the Doppler signals. In a pulsed Doppler system, pulses of a few cycles of carrier frequency $w_c$ are transmitted by a transducer into a region containing the structures for which the velocities are to be determined. Because each structure may have a different velocity, the frequency of the reflections from the various structures may differ from $w_c$ by an amount depending on the absolute value of the velocity. The envelope of the reflected wave after N pulses is the analog wave to be examined. It is sampled at the Nyquist rate with respect to the highest frequency above $w_c$ that is of interest. If only absolute values of frequency are to be determined, the samples are uniformly spaced and are called "real" samples; but if the direction of each velocity is to be determined as well, each real sample is followed by an imaginary sample that is spaced from it by the duration of one-quarter of a cycle of $w_c$.

BRIEF SUMMARY OF THE INVENTION

In an automatic gain control system incorporating this invention, the amplitude of the analog wave or the amplitude of the samples in analog or digital form is reduced when the overflows occurring in at least some of the butterfly operations indicate that the accuracy of the results obtained is below an acceptable level. A number of different relationships between the reduction in amplitude and the overflows can be used, e.g., the amplitude can be progressively reduced as the number of butterfly operations in a single pass that have at least one overflow increases or the amplitude can be reduced after each pass in which the number of butterfly operations having at least one overflow exceeds a given value for that pass. In either of these cases, the numbers of overflows rather than the number of butterfly operations having at least one overflow can be used. In the second case, the changes in amplitude that are made should take into account the fact that overflows occurring in an early pass have a greater adverse effect on the amplitudes of the N frequencies than overflows occurring in a later pass so that the given number of allowable overflows for successive passes should increase with correspondingly larger gain reductions for earlier passes.

Up to this point, all discussion has centered on decreasing amplitude, but any AGC system must also have the ability to increase the gain as the amplitude of the signal decreases. In an analog system, this function may be carried out by permitting the capacitor across which the AGC voltage is developed to discharge, but in a digital system controlled by a microprocessor, information has to be given to the processor which will cause it to increase the gain. This can be provided by selecting a minimum number of overflows that are to occur in the last pass involved in the AGC system and increasing the gain to a predetermined value whenever the number of overflows is equal to or less than the minimum. The minimum number can be selected so that the corresponding error in the amplitudes of the N frequencies is insignificant.

Instead of having separate means for performing each butterfly operation, one means can be used. The incoming samples are buffered and the inputs of the single butterfly means can be successively connected to receive different groups of samples. The outputs of the means for each butterfly operation of one pass are stored and used as inputs for the butterfly means during the next pass.

Such a gain control system operates in a satisfactory manner except when the input signal is random noise rather than an analog wave, in which event no overflows occur in the butterfly operations so that the amplitudes of the samples applied to the FFT are continually increased. When the AGC system is being used in apparatus for measuring the velocity distribution of blood flow, the sound produced in response to the analog wave to which the operator listens becomes very loud and the screen presenting a plot of spectral distribution becomes full scale whenever the transducer is not in firm contact with the patient's body. Whereas these effects are to be expected before the transducer is first placed in contact with the body, it is a source of considerable annoyance for them to occur every time the position of the transducer is changed.

In accordance with another aspect of this invention, therefore, means are provided for preventing the AGC system from increasing the amplitude of the input samples of the FFT when the input signal is noise. There are a number of ways of performing this function, but in general they operate in response to the frequency content of the input signal. When it is the desired wave, its component frequencies lie in a narrower band, i.e., they are not broad band and have a spectral signature that is discernable from noise because noise yields a nearly flat amplitude distribution. One way of recognizing this difference is to compare the amplitude of a frequency corresponding to the carrier frequency with the amplitude of a frequency that is above or below the carrier frequency and still within the expected amplitude distribution. When the ratio is above a given value, the signal can be treated as a desired signal; and when it is below the given value, the signal can be treated as noise.

In accordance with still another aspect of this invention the signal is considered to be the desired signal if its variance is less than a given value and considered to be noise if its variance is greater than the given value. It can be shown that the variance can be expressed as follows.

$$VAR = \frac{\text{2nd moment}}{\text{0th moment}} - \left(\frac{\text{1st moment}}{\text{0th moment}}\right)^2 \quad (4)$$

$$\text{0th moment} = \sum_{n=0}^{N-1} A_n \quad (5)$$

$$\text{1st moment} = \sum_{n=0}^{N-1} f_n A_n \quad (6)$$

$$\text{2nd moment} = \sum_{n=0}^{N-1} (f_n)^2 A_n \quad (7)$$

wherein the 0th moment is the integral under the power spectrum.

DETAILED DESCRIPTION OF THE INVENTION

Figure 1:
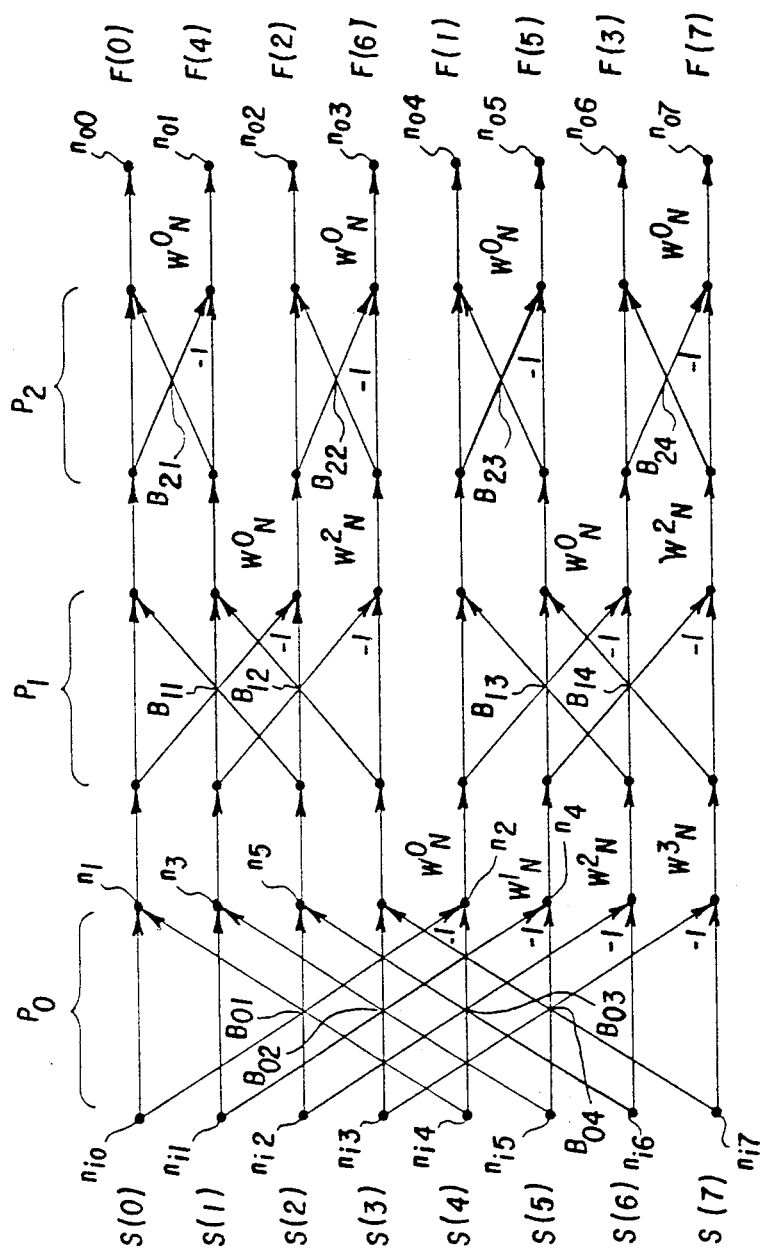
FIG. 1 is a flow chart illustrating one of many decimation-in-frequency sequences of FFT computations that may be used in an FFT in which $N=8$.

In order to obtain a more concrete idea of what is meant by butterfly operations and passes, reference is now made to FIG. 1 which is a flow chart illustrating one sequence of computations for an FFT system in which $N=8$. In this and other flow charts of the sequence of computations for an FFT, the values at the base of an arrow are considered to flow along it, and when two arrowheads meet, the values for these arrows are added. The presence of $W_N$ raised to some power along an arrow means that what is at the base of the arrow is multiplied by that factor. When there is a minus sign along the arrow, it means that the value at its base is multiplied by $-1$.

Figure 2:
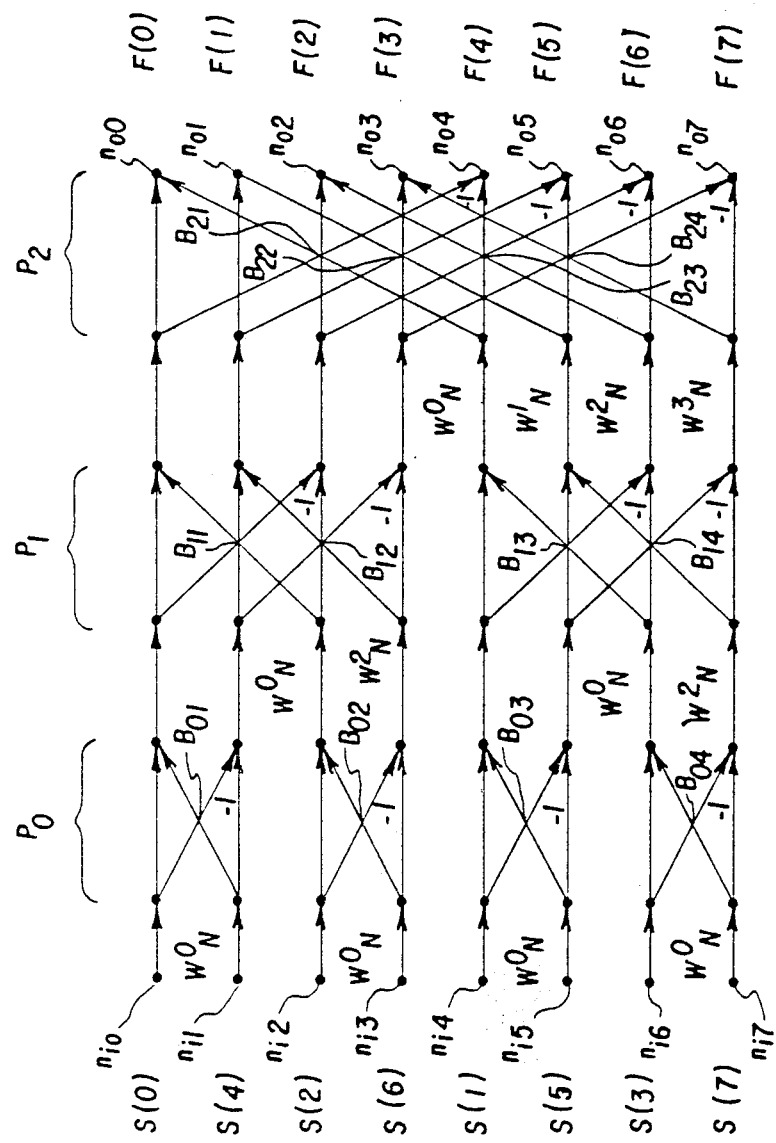
FIG. 2 is a flow chart illustrating one of many decimation-in-time sequences of FFT computations that may be used in an FFT in which $N=8$.

Eight successive samples $S(0)$ through $S(7)$ of the analog wave for which the amplitudes of eight frequencies are to be determined are applied to the eight input nodes $n_i0$ through $n_i7$ of the flow chart in normal order as indicated. For the particular FFT illustrated, the amplitudes of the eight frequencies $F(0)$ through $F(7)$ respectively appear at the output nodes of the flow cart in bit-reversed order. Such a transform is called a "decimation in frequency", DIF. FIG. 2 illustrates an analagous flow chart in which the samples are applied to the input nodes in bit-reversed order and the amplitudes of the frequencies occur in natural order at the output nodes. This is called a "decimation in time", DIT.

If the input samples are real, i.e., not complex, and are equally spaced, then the amplitude of the frequency $F(0)$ represents DC and the amplitudes of the frequencies $F(1)$ through $F(7)$ are for frequencies from $DC+f_s/N$ to $F(7)$ in increments of $f_s/N$. It should be noted that $F(5)$ through $F(7)$ are above Nyquist and, as such, are aliased. If the FFT is being used in a Doppler system to determine velocity of reflectors, such a system will not yield any information as to whether a reflector is moving toward or away from the source; but if the samples are complex, i.e., in pairs spaced by 90° of the carrier frequency, the spectral components $F(0)$ through $F(4)$ are positive frequencies, DC through $4f_s/N$, from which the velocities toward the source can be determined and frequencies $F(5)$ through $F(7)$ are negative frequencies from which the velocities away from the source can be determined. If complex samples are used, the first sample of each pair is the real component, the second sample is the imaginary component, and all the mathematical operations indicated in flow charts such as shown in FIGS. 1 and 2 have to be carried out for all samples as complex. For the sake of simplicity, the invention will be explained using real samples only but it will be understood that it can be used when complex input samples are used.

Examination of FIG. 1 shows that the value of the sample S(0) applied to the input node $n_i0$ is added at a node $n_1$ (not shown in the drawing to the value of the sample S(4) that is applied to the input node $n_i4$ and that the value of S(4) is inverted and added to the value of the sample S(0) at a node $n_2$. The value at the node $n_2$ is then multiplied by $W^0{}_N$. These operations are all that are required for a butterfly operation $B_{01}$. The name "butterfly" is used because the arrows used to indicate the operations form a geometric shape something like a butterfly, and the designation of each butterfly operation is at the intersection of these arrows. Similar operations are performed in a butterfly operation $B_{02}$ with the values of the samples S(1) and S(5) so as to derive their sum at a node $n_3$, their difference at a node $n_4$, and the product of the difference and $W^1{}_N$. The values of the samples S(2) and S(6) are involved in a butterfly operation $B_{03}$ where the multiplier of the difference is $W^2{}_N$ and the values of the samples S(3) and S(7) are involved in a butterfly operation $B_{04}$ where the multiplier of the difference is $W^3{}_N$. The butterfly operations $B_{01}$ through $B_{04}$ constitute a pass $P_0$. The next pass $P_1$ is comprised of butterfly operations $B_{11}$, $B_{12}$, $B_{13}$ and $B_{14}$ that operate on different pairs of outputs of the butterfly operations of the pass $P_0$, e.g., $B_{11}$ operates on the value at the node $n_1$ that was determined in $B_{01}$ and the value at a node $n_5$ that was determined in $B_{03}$. The third pass is comprised of butterfly operations $B_{21}$, $B_{22}$, $B_{23}$ and $B_{24}$ in which the multipliers of the subtracted values are all $W^0{}_N$. Thus, the first pass $P_0$ is completed when all the sample values are involved in a butterfly operation and all subsequent passes such as $P_1$ and $P_2$ are completed when all the outputs of a previous pass are involved in a butterfly operation. After the third pass $P_2$, the amplitudes of the frequencies F(0) through F(7) appear in bit-reversed order at the output nodes $n_{o0}$ through $n_{o7}$ respectively.

FIG. 2 illustrates a sequence of operations for an FFT wherein the values of the samples S(0) through S(7) are applied to the input nodes $n_{i0}$ through $n_{i7}$ in bit-reversed order and the amplitudes of the N frequencies F(0) through F(7) appear at the output nodes $n_{o0}$ through $n_{o7}$ in natural order. This type of operation is known as a "decimation in time", DIT. It is believed that the indicated butterfly operations and passes are self-explanatory. Note that the multiplication by various powers of $W_N$ occurs prior to a butterfly operation rather than after it as in FIG. 1.

In FIGS. 1 and 2, each butterfly operation has had two inputs and two outputs, but it is possible that butterfly operations could have more inputs and outputs. In any event, the terms representing the amplitude of any particular frequency component that are derived by following the sequence of operations of a flow chart will be the same as the terms resulting from the application of equation (1).

Figure 3:
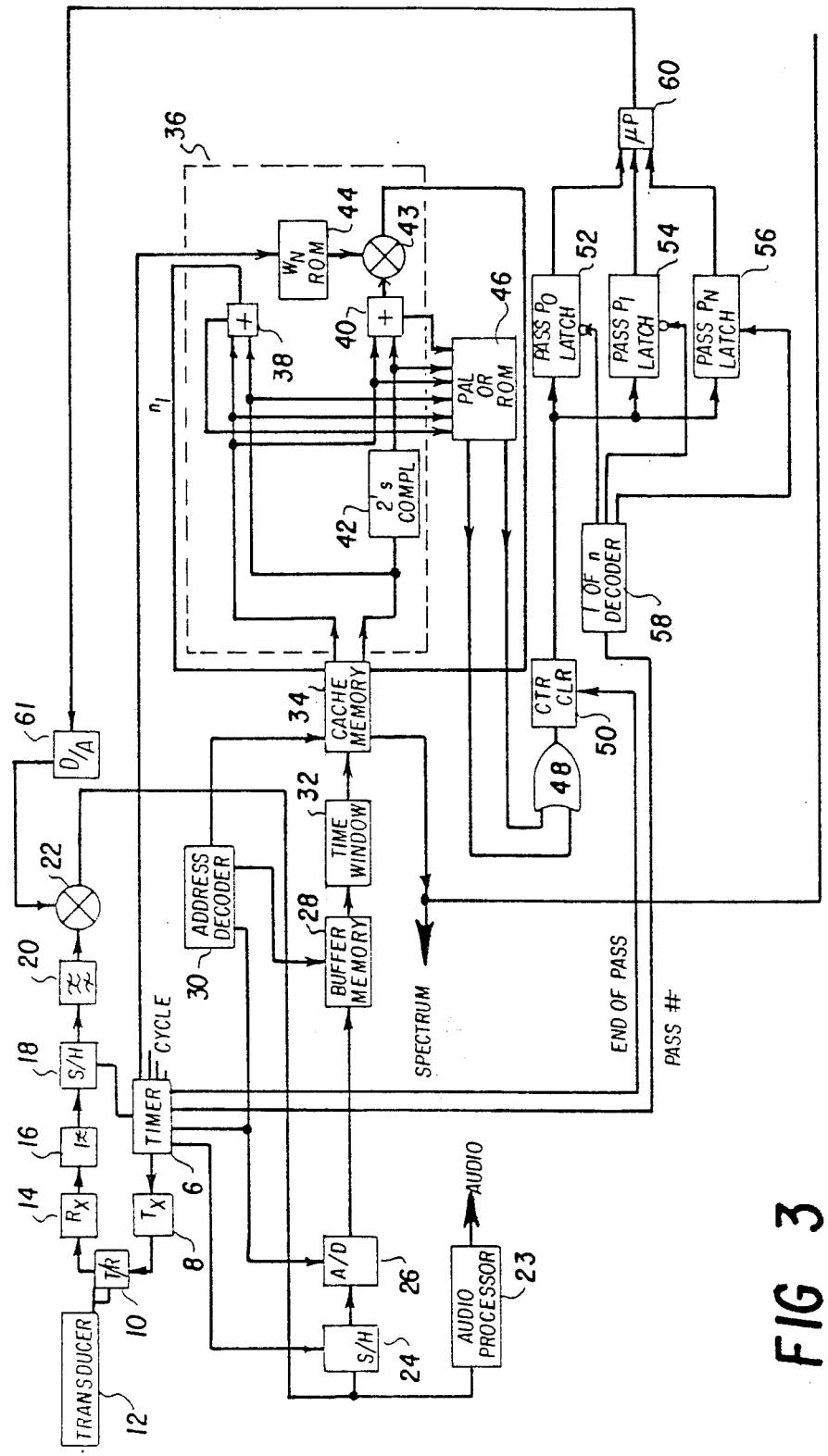
FIG. 3 is a block diagram of a Doppler system utilizing an automatic gain control operating in accordance with the principles of this invention.

Reference is now made to the block diagram of FIG. 3 illustrating Doppler apparatus for analyzing the flow of blood and in which the amplitude of the signal applied to the FFT employed is controlled in accordance with this invention. Clock pulses for the apparatus, as well as timing pulses for various functions it is to perform, are provided by a timer 6. One set of timing pulses is applied to a transmitter 8 that outputs a series of keying pulses in response to each timing pulse that are respectively applied via a transceiver 10 to different crystals (not shown) of a transducer 12 that is held against a patient's body. Each crystal produces several cycles of ultrasonic pressure waves of a carrier frequency $W_c$ and the pressure waves from all of the crystals form a beam having a wavefront that moves in a direction determined by the relative timing of the keying pulses. When the pressure waves impinge on discontinuities in acoustic impedance such as are provided by blood particles, a portion of their energy is reflected back to each crystal, causing them to produce corresponding electrical waves. Because the pressure waves reflected from any particle arrive at the crystals at respectively different times, the resulting electrical waves are not in phase but they can be made cophasal by introducing a proper delay for each crystal. The electrical waves can then be summed in an analog manner. These functions are performed in a receiver 14. The receiver 14 also reduces the frequency of the electrical waves to an intermediate value. If the discontinuity is moving toward the transducer 12, the frequency of the corresponding summed waves will be greater than $w_c$. When blood flow is being analyzed, the summed wave has frequency components respectively corresponding to the velocities of many blood particles, and because some of the particles may be moving toward the transducer 12 and some may be moving away from it, the summed wave may have frequency components greater than $w_c$ as well as components that are less than $w_c$.

After undesired high frequencies are eliminated from the intermediate frequencies by a filter 16, the summed signal is applied to a sample-and-hold device 18 that is activated by signals from the timer 6 only when the summed signal corresponds to reflections from discontinuities within the range of interest. The reflection from the walls of the artery can undesirably contribute to the summed signal, but because the velocity with which the walls move is very small with respect to the velocities of the blood particles, the contribution can be eliminated by the insertion of a band pass filter 20 that prevents the low frequencies associated with the wall movement from passing through it. The signal at the output of the filter 20 is the analog wave that is to be analyzed for frequency content by the FFT.

At some point in the path of the summed signal, preferably after the filter 20, means 22 is provided for varying the amplitude of the summed signal under the control of signals provided in accordance with this invention. The gain controlled summed signal may be applied to an audio processing circuit 23 that produces an audio signal varying in frequency in the same manner as the Doppler reflection but in any event, it is applied to digitizing means comprised of a sample-and-hold device 24 having its output coupled to an analog-to-digital converter 26, both of which are controlled at a Nyquist rate by the timer 6. The purpose of the sample-and-hold device 24 is to maintain a constant value for a sufficiently long time to permit the A/D converter 26 to operate in a satisfactory manner.

Each of the samples for the range selected by the sample-and-hold device 18 that appear at the output of the A/D converter 26 are applied to sequential addresses in a buffer memory 28 and read therefrom under the control of an address decoder 30 that is synchronized with the timing pulses that activate the A/D converter 26.

A Fourier transform assumes that the wave being analyzed is continuous, but in an FFT, N samples are assumed to be continuous so that sample 0 becomes concatenated with the sample $N-1$. If the sinusoidal components of the summed analog wave are integral with a period during which the N samples occur, no harm is done; but if, as is the usual case, they are not integral therewith, there are discontinuities between the last sample $N-1$ of the period and the first that introduce frequency components on either side of the frequency of the sinusoid. Such frequencies are an error and are referred to as "spectral leakage". In order to reduce this leakage, the samples read from the buffer 28 are applied to a time window 32 that weights the N samples such that the amplitudes of the samples at the beginning of a time window gradually increases from zero and the amplitudes of the samples at the end of the time window gradually decreases to zero.

After passing through the time window 32, the N samples are applied to a cache memory 34 and are read therefrom and applied to a means 36 for performing a butterfly operation on successive pairs as required by the particular FFT sequence employed. If the sequence shown in FIG. 1 is being used, the first pair of samples would be S(0) and S(4). As each butterfly operation of the first pass is completed, its outputs are stored in the cache memory 34 at an address determined by the address decoder 30 so as to be available for application to the inputs of the butterfly operation means 36 during the next pass. After the last pass is completed, the values in the cache memory 34 are the relative amplitudes or spectrum of the N frequencies in the order determined by the particular FFT sequence used.

The means 36 for performing a butterfly operation is herein shown as being comprised of an adder 38 having inputs respectively connected to the outputs of the cache memory 34, an adder 40 having one input connected to one of the outputs of the cache memory 34 and its other input connected via a 2's complement device 42 which serves to invert the polarity of the signal applied to it to the other output of the cache memory. The output of the adder 38 is connected to the cache memory 34 for temporary storage therein and the output of the adder 40 is coupled via a multiplier 43 to the cache memory 34 for temporary storage therein. The multiplier 43 serves to multiply the output of the adder 40 with a suitable power of $W_N$ that is supplied by a $W_N$ ROM 44 at an appropriate time determined by a pulse from the timer 6. Because the multiplier 43 is at the output of the adder 40, the configuration shown is for DIF FFT sequence such as shown in FIG. 1; but if the sequence of FIG. 2 were used, the multiplier 43 would be connected between the 2's complement device 42 and the input of the butterfly device 36 and before the signal split to adder 38.

In order to detect overflows occurring during a butterfly operation, the sign inputs and carry bits of the adders 38 and 40 are applied to a PAL or ROM 46 which is so constructed as to provide a signal at one output thereof when the adder 38 overflows and a signal at another output thereof when the adder 40 overflows. These outputs are respectively connected to inputs of an OR gate 48, and its output is connected to a counter 50.

If the outputs of the PAL or ROM 46 are not latched, a signal indicating an overflow in the adder 38 will reach the OR gate 48 before a signal indicating an overflow in the adder 40 because of the delay introduced by the 2's complement device 42 so that each signal, if present, will cause the output of the OR gate 48 to change state. The counter 50 is cleared at the end of each pass so that its count will equal the total number of overflows that have occurred during the pass.

If the outputs of the PAL or ROM 46 are latched, a signal indicating an overflow in the adder 38 will reach the OR gate 48 at the same time as a signal indicating an overflow in the adder 40 even though the signals were formed at different times. In this case, the count at the output of the counter 50 will equal the number of butterfly operations in which at least one of the adders 38 and 40 overflowed.

The following means are provided for placing the overflow count of the counter 50 for each pass in a respectively different latch. In sequences having three passes, such as those in FIGS. 1 and 2, three latches 52, 54 and 56 are required. During each of the passes $P_0$, $P_1$ and $P_2$. a different number is supplied to a 1 of n decoder 58 so as to cause it to respectively enable the latches 52, 54 and 56. At the end of each pass, the timer 6 supplies a pulse to the clear terminal of the counter 50 so as to reset it to zero and cause it to load its count into the latch that is enabled. Accordingly, when the FFT sequence is completed, the counts in the latches 52, 54 and 56 correspond to the number of overflows respectively occurring in the passes $P_0$, $P_1$ and $P_2$ if the outputs of the PAL 46 are not latched or to the number of butterfly operations in each pass having at least one overflow if the outputs of the PAL 46 are latched. A processor 60 coupled so as to read the latches 52, 54 and 56 is programmed so as to produce a digital signal corresponding to the desired gain. This signal is coupled via a digital-to-analog converter 61 to the gain control means 22. The processor 60 can be a ROM or any equivalent means.

Figure 4:
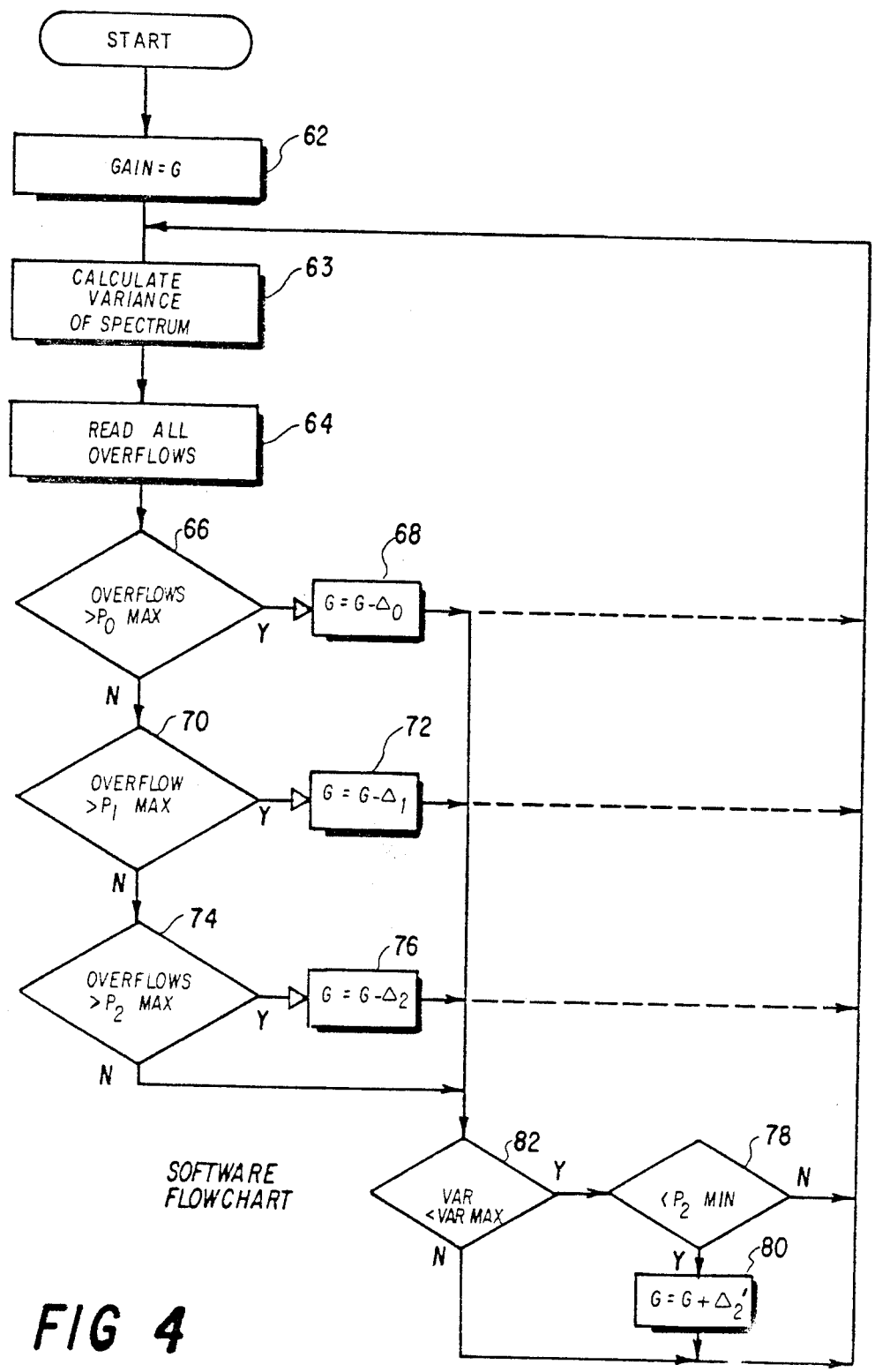
FIG. 4 is a flow chart illustrating one way in which the processor of an AGC system employing this invention and in which $N=8$ may operate.

Reference is now made to the flow chart of FIG. 4 for an illustration of one way in which the processor 60 may operate for an FFT sequence having three passes. At the start, the gain is set at an initial value, box 62. The amplitudes of the N frequencies in the spectrum provided by the cache memory 34 are supplied to the processor 60 so that it can calculate the variance, VAR, of the signal. The details of this calculation will be discussed at a later point by reference to the flow charts of FIGS. 5, 6 and 7. All overflows from the latches 52, 54 and 56 are read, box 64. The number, $n_0$, of overflows in the latch 52 is compared with an arbitrarily chosen number $P_0MAX$, box 66. If $n_0$ exceeds $P_0MAX$, a digital signal is generated, box 68, that when applied to the D/A converter 61 will cause the amplitude control device 22 to make an arbitrarily selected reduction in gain of $\Delta_0$. If, however, $n_0$ is less than $P_0MAX$, the number of overflows, $n_1$, in the latch 54 is compared with an arbitrarily chosen number $P_1MAX$, box 70. If $n_1$ exceeds $P_1MAX$, a digital signal is generated, box 72, that when applied to the D/A converter 61 will cause the amplitude control device 22 to make an arbitrarily selected reduction in gain of $\Delta_1$. If, however, $n_1$ is less than $P_1MAX$, the number of overflows $n_2$ in the latch 56 is compared with an arbitrarily chosen number $P_2MAX$, box 74. If $n_2$ exceeds $P_2MAX$, a digital signal is generated, box 76, that when applied to the D/A converter 61 will cause the amplitude control device 22 to make an arbitrarily selected reduction in gain of $\Delta_2$. If, however, $n_2$ is less than $P_2MAX$, $n_2$ is compared with an arbitrarily chosen number $P_2MIN$ that is less than $P_2MAX$, box 78. If $n_2$ is less than $P_2MIN$, a signal is generated, box 80, that when applied to the D/A converter 61 will cause the amplitude control device 22 to make an arbitrarily chosen increase in gain of $\Delta_2'$ which may be the same as or different from $\Delta_2$.

If any of $n_0$, $n_1$ and $n_2$ are respectively greater than $P_0MAX$, $P_1MAX$ and $P_2MAX$, there is no need to perform the comparison of $n_2$ with $P_2MIN$ indicated by the box 78 because in such circumstances the amplitude of the samples applied to the FFT is too large and not too small so that whichever ones of the reduction in gain, $\Delta_0$, $\Delta_1$ and $\Delta_2$, are indicated may be applied directly to the D/A converter 61 as indicated by the dashed lines. If, however, none of $n_0$, $n_1$ and $n_2$ are respectively greater than $P_0MAX$, $P_1MAX$ and $P_2MAX$, the comparison of $n_2$ with $P_2MIN$ must be made, box 78, so as to increase the gain by $\Delta_2'$, box 80. The gain is increased in increments of $\Delta_2'$ until one of the reductions in gain of $\Delta_0$, $\Delta_1$ and $\Delta_2$ occurs. Ideally, the AGC in the final steady state should oscillate by $+\Delta_2'$ and $-\Delta_2$.

This description of operation of the invented automatic gain control system does not take into account the effect of variance. Whereas this is not necessary, an input signal that is essentially noise, such as that which occurs when a transducer is not in contact with a patient's body, will cause no overflows so that the number of overflows in the last pass, $P_2$ in this example, will always be less than $P_2MIN$, box 78, and cause an incremental increase in gain of $\Delta_2'$, box 80. On each loop then, the gain is increased by $\Delta_2'$ until maximum gain is achieved. This can cause the audio processor 60 to output an excessively loud and annoying sound and cause the display of the spectral distribution to become near full-scale.

In order to prevent this from occurring, the variance calculation of VAR, box 63, is compared with an arbitrarily selected value of variance VAR MAX, box 82. If VAR is less than VAR MAX, the signal is not noise, and the system operates as just described; but if VAR is greater than VAR MAX, the signal is considered to be noise and the gain is not increased and is left wherever it was. The comparison of VAR with VAR MAX can be done after each determination of the gain reductions $\Delta_0$, $\Delta_1$ and $\Delta_2$ and the application to the D/A converter 61 can be prevented if VAR is greater than VAR MAX. If, however, any reduction in gain such as $\Delta_0$, $\Delta_1$ or $\Delta_2$ is indicated, the input signal will not be noise so that the variance can be calculated on the next loop as indicated by the dashed lines.

Figure 5:
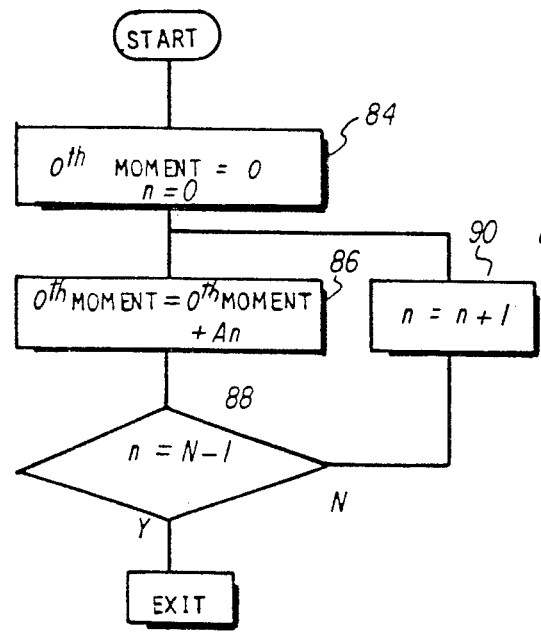
FIGS. 5, 6 and 7 are flow charts respectively indicating how the 0th, 1st and 2nd moments may be calculated.

A flow chart indicating a way in which the 0th moment can be calculated is shown in FIG. 5. As indicated in equation (5), the 0th moment is merely the sum of all the amplitudes of the N frequencies. At the start, the initial value of the 1st moment is zero, box 84. Box 86 indicates that the amplitude $A_n$ of one of the N frequencies is added to the old value, which in this case is zero. If n is not equal to $N-1$, box 88, one is added to the value of n so as to obtain $n+1$, box 90. The amplitude $A_{n+1}$ of another one of the N frequencies is then added to $A_n$, box 86. This process continues until $n=N-1$, at which point the output of the box 86 is the 0th moment.

Figure 6:
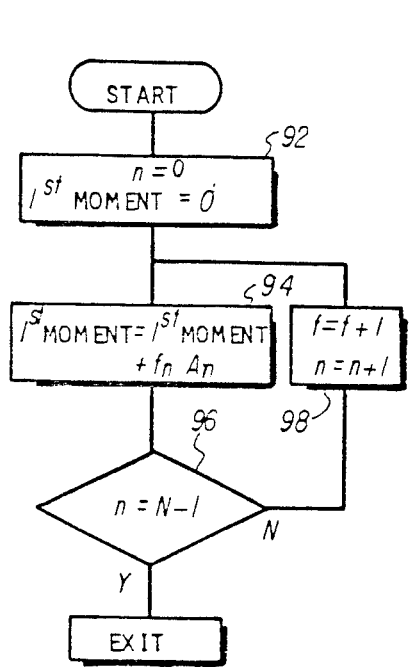

A flow chart indicating a way in which the 1st moment can be calculated is shown in FIG. 6. As indicated in equation (6), the 1st moment is the sum of the products of each of the N frequencies and its respective amplitude. At the start, the initial value of the 2nd moment is zero, box 92. Box 94 indicates that the product of $f_n A_n$ is added to the old value, which in this case is zero. If n is not equal to $N-1$, box 96, n is increased by one, box 98, and the product of the frequency $f_{n+1}$ and its amplitude $A_{n+1}$ is added to the old value, box 94. This continues until $n=N-1$, at which point the output of the box 94 is the 1st moment.

Figure 7:
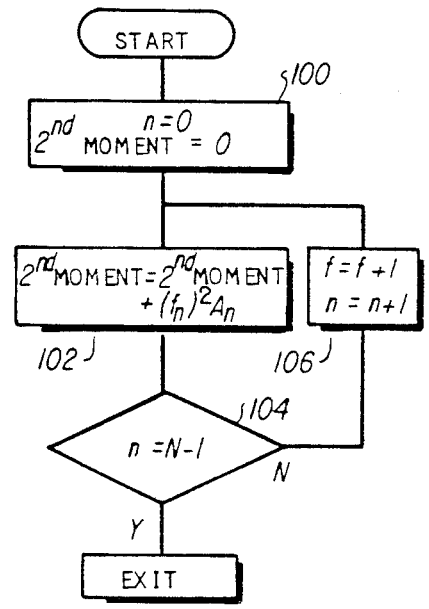

A flow chart indicating a way in which the 2nd moment can be calculated in shown in FIG. 7. The functions represented by the boxes 100, 102, 104 and 106 respectively correspond to the functions represented by the boxes 92, 94, 96 and 98 of FIG. 6 except that a value of $(f_n)^2 A_n$ is added to the old value of the 2nd moment until $n=N-1$, at which point the output of the box 102 is the 2nd moment.

It is thought that one skilled in the art would have no difficulty in programming the microprocessor 60 so that it can calculate the moments as set forth above and to calculate the variance VAR in accordance with equation (4).

It is also believed that one skilled in the art could easily program the microprocessor 60 to reduce the gain in proportion to the number of overflows in each pass.

The description above has been for a system wherein only real samples are used so that the direction of the various velocity components is not indicated, but the invention would be equally applicable to a system employing real and imaginary samples so as to enable the direction of the velocity components to be determined. In such a system, a real sample occurs during each cycle of the carrier frequency $w_c$ and an imaginary sample occurs 90° later. The complex samples would be processed in an analogous manner. If, as in FIGS. 1 and 2, $N=8$, the spectral outputs $F(0)$ through $F(4)$ represent five frequencies, DC through $4f_s/N$, indicating velocities toward the transducer and three frequencies $F(5)$ through $F(7)$ indicating velocities away from the transducer. If the samples applied to the FFT are real, i.e., not complex, the outputs of the FFT indicate the relative amplitudes of frequencies from DC to the sampling frequency in increments of $f_s/N$, but ther is no direction information.

Instead of performing a hardware FFT, a software FFT could be used while still employing the AGC concept proposed with the hardware FFT. All intermediate calculations in software would exactly parallel the hardware implementation. Of course, processing speed would be slower. However, the overflows would still be used to determine the AGC control voltage which would be applied to the signal to be transformed for controlling its level.

What is claimed is:

1. Apparatus for determining the amplitude of each of a plurality of frequency components of a signal comprising:

an input circuit adapted to receive a signal to be analyzed, sampling means coupled to said input circuit for deriving samples of a signal applied to said input circuit, transform means including adding means for performing the butterfly operations for a plurality of successive passes of a Fourier transform so as to provide signals respectively indicating the amplitudes of various frequency components of signal applied to said input circuit, gain control means coupled in series with said sampling means for varying the amplitude of samples coupled to said transform means, detection means coupled to said adding means for deriving indications of at least some of the overflows occurring in said adding means, means coupled to said detection means for counting the number of indications, and control means coupled to said means for controlling for controlling said gain control means so that it reduces the amplitude of the samples coupled to said transform means by a given amount when the number of indications of overflows occurring during given butterfly operations is greater than a given value and increases the amplitude of the samples coupled to said transform means by a predetermined amount when the number of indications occurring during predetermined butterfly operations is less than a predetermined value.

2. Apparatus as set forth in claim 1 wherein said given butterfly operation and said predetermined butterfly operations are in the same pass.

3. Apparatus as set forth in claim 1 wherein said given butterfly operations are in one pass and said predetermined butterfly operations are in a pass occurring after said one pass.

4. Apparatus as set forth in claim 1 wherein the number of indications of overflows occurring during said given butterfly operations is equal to the number of indications of overflows occurring during said predetermined butterfly operations.

5. Apparatus as set forth in claim 1 futher comprising:
means coupled to said input circuit for deriving an indication of the signal to noise ratio of a signal applied to said input circuit, and means coupled to said control means and to said latter means for preventing said control means from increasing the amplitude of samples coupled to said transform means when said ratio is less than a selected value.

6. Apparatus as set forth in claim 5 wherein
said means for deriving the signal to noise ratio is comprised of said Fourier Transform and means for determining variance of the signals at its outputs.

7. Apparatus as set forth in claim 1 wherein said given butterfly operations are in one pass and said control means reduces the amplitude of the samples coupled to said transform means by another incremented amount when the number of indications of overflows occurring during butterfly operations of another pass is greater than another given value.

8. Apparatus for determining the amplitude of each of a plurality of frequency components of a signal comprising:
an input circuit adapted to receive a signal to be analyzed, sampling means coupled to said input circuit for deriving samples of a signal applied to said input circuit, transform means including adding means coupled to said sampling means for performing the butterfly operations for a plurality of successive passes of a Fourier transform, gain control means coupled in series with said sampling means for varying the amplitude of samples coupled to said transform means, detection means coupled to said adding means for deriving indications of at least some of the overflows occurring in said adding means, means coupled to said detection means for counting the number of indications, and control means coupled to said means for counting for controlling said gain control means so that it controls the amplitude of samples coupled to said transform means.

9. A method of controlling the amplitudes of samples applied to a Fourier transform system comprising:
supplying samples of a wave to be analyzed, performing butterfly operations that include adding on said samples for a plurality of passes, deriving indications of overflows occurring in the adding of a plurality of the butterfly operations, counting the number of indications, and controlling the amplitude of the samples applied to the system in accordance with the number of indications counted.

* * * * *